No. 644,377. Patented Feb. 27, 1900.
J. H. THEURET.
ANIMAL TRAP.
(Application filed Dec. 12, 1899.)
(No Model.)

WITNESSES:
J. P. Appleman
A. M. Haymaker

INVENTOR
John H. Theuret
BY
N. C. Evert & Co.
ATTORNEYS.

THE NORRIS PETERS CO., PHOTO-LITHO., WASHINGTON, D. C.

United States Patent Office.

JOHN H. THEURET, OF PITTSBURG, PENNSYLVANIA.

ANIMAL-TRAP.

SPECIFICATION forming part of Letters Patent No. 644,377, dated February 27, 1900.

Application filed December 12, 1899. Serial No. 740,079. (No model.)

*To all whom it may concern:*

Be it known that I, JOHN H. THEURET, a citizen of the United States of America, residing at Pittsburg, in the county of Allegheny and State of Pennsylvania, have invented certain new and useful Improvements in Animal-Traps, of which the following is a specification, reference being had therein to the accompanying drawings.

My invention relates to certain new and useful improvements in animal-traps, and more particularly to that class of animal-traps constructed of wire.

One object of my invention is to construct a trap of this character with a pair of spring-actuated clamping-jaws for trapping and securing the animal until released, the clamping-jaws being operated by the animal engaging a suitable bait-hook.

A further object of my invention is to construct a trap of this character made entirely of wire which will be simple in its construction, strong, durable, and efficient in its use and comparatively inexpensive to manufacture.

Briefly described, my invention consists of a base formed entirely of wire, having one end bent to form a spring-actuated operating-bar a pair of skeleton clamping-jaws formed entirely of wire pivotally connected to said base and engaged by the forward end of said operating-bar, and a bait-hook connected to a fastening-arm adapted to retain the operating-bar, and clamping-jaws in an inoperative position until the animal engages the bait-hook and operates the fastening-bar.

My invention finally consists in the novel combination and arrangement of parts to be hereinafter more fully described, and specifically pointed out in the claim.

In describing the invention in detail, reference is had to the accompanying drawings, forming a part of this specification, and wherein like numerals of reference indicate corresponding parts throughout the several views, in which—

Figure 1:
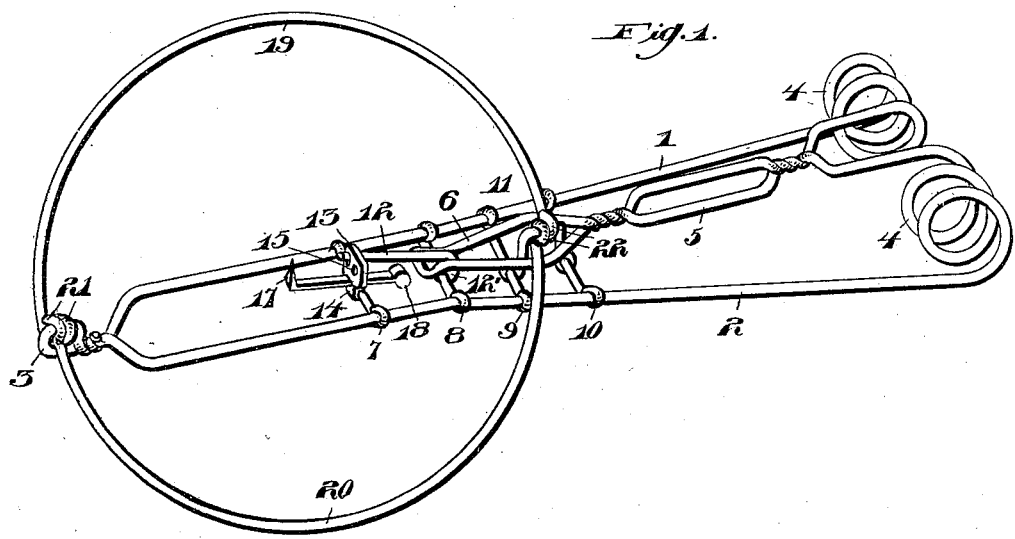
Figure 2:
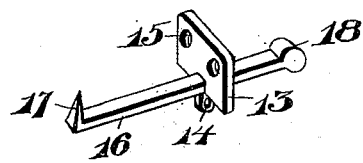
Figure 3:
Figure 4:
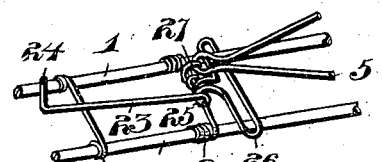

Figure 1 is a perspective view of my improved animal-trap. Fig. 2 is a perspective view of the bait-hook and means of supporting the same. Fig. 3 is a like view of the fastening-bar. Fig. 4 is a perspective view of a modified form of construction of bait and fastening hook.

Referring to the drawings by reference-numerals, 1 and 2 indicate the sides of a skeleton base constructed of a piece of suitable wire bent in a tapering manner to form the same. The forward end of the side 2 is provided with a loop 3, while the rear end of both the sides is formed with a series of spring-loops 4 and an upwardly-extending operating-arm 5, bent at its upper end, as at 6.

7, 8, 9, and 10 indicate a series of cross-wires forming braces for keeping the sides 1 and 2 apart and are securely fastened thereto. The braces 9 and 10 have connected thereto an upwardly-extending yoke-shaped support 11, the brace 8 having pivotally mounted thereon a fastening-arm 12, this arm being provided with an eye 12′ to permit of the mounting of the same in the manner desired. The brace 7 is provided with a pivotally-mounted catch-plate 13, this plate having an eye 14 formed in the bottom thereof to permit of the same being mounted in the manner desired. The plate 13 is also provided near the top thereof with a pair of openings 15, adapted to receive the end of the fastening-arm, and is also adapted to retain in position near the bottom thereof the bait-hook 16, this hook extending through the plate, as shown. The bait-hook 16 has one end formed with a point or hook 17 and its opposite end with a weight 18.

The clamping-jaws 19 and 20 consist of two pieces of suitable wire bent in a substantially-semicircular manner and at one end thereof formed with an eye 21, which is pivotally secured in the loop 3, while the opposite end of these clamping-jaws is also formed with a similar eye 22 for pivotally securing the same to the support 11. The rear portion of the clamping-jaws is adapted to be surrounded by the opening 6 at the upper end of the operating-arm 5, so that when the arm is elevated it will draw the jaws together and securely hold them in position.

The modified form of construction shown in Fig. 4 consists of a bait-hook 23, bent at one end to form a hook or point 24, and at its opposite end a series of spring-loops 25 for mounting upon the cross-brace 8 and also bent to form a stop-loop 26 and fastening-hook 27 for retaining the operating-arm 5 in an inoperative position.

The operation of my improved trap is as follows: The fastening-arm 12 is lowered and the free end thereof engaged in one of the openings 15 of the plate 13. This retains the operating-arm in the position as shown in Fig. 1. A suitable bait is mounted upon the point or hook 17, and when the same is engaged by the animal the bait-hook 16 is lowered, causing the weight 18 to engage the fastening-arm 12 and remove the same from the opening in the plate 13. As the arm is removed from the plate 13 the action of the spring-loops 4 will cause the operating-arm to be elevated and ride upwardly on each of the jaws 19 20, drawing the same together and trapping the animal and securing the same in position until released.

It is thought that the many advantages of my improved construction can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

In an animal-trap, a suitable base, a pair of clamping-jaws suitably connected thereto, a catch-plate 13 pivotally connected to the said base and provided with a pair of openings, a bait-hook secured in the said catch-plate, a fastening-arm pivotally connected to said base and adapted to engage in one of the said openings of the catch-plate and also adapted to be operated by the said bait-hook, a spring-actuated operating-arm connected to said base and adapted to be retained in an inoperative position by said fastening-arm and when released therefrom by means of the bait-hook is adapted to operate said clamping-jaws.

In testimony whereof I affix my signature in the presence of two witnesses.

JOHN H. THEURET.

Witnesses:
JOHN NOLAND,
E. W. ARTHUR.